US008438658B2

(12) United States Patent
Hofstee et al.

(10) Patent No.: US 8,438,658 B2
(45) Date of Patent: May 7, 2013

(54) PROVIDING SEALED STORAGE IN A DATA PROCESSING DEVICE

(75) Inventors: H. Peter Hofstee, Austin, TX (US); Kanna Shimizu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1920 days.

(21) Appl. No.: 11/345,923

(22) Filed: Feb. 2, 2006

(65) Prior Publication Data

US 2007/0179904 A1    Aug. 2, 2007

(51) Int. Cl.
*G06F 17/30* (2006.01)
*G06F 7/04* (2006.01)
*H04N 7/16* (2006.01)

(52) U.S. Cl.
USPC ............. 726/30; 726/26; 726/27; 726/29; 705/50; 705/51; 705/55; 705/56

(58) Field of Classification Search ............. 705/50–79; 726/30
See application file for complete search history.

(56) References Cited

U.S. PATENT DOCUMENTS

| 6,118,870 | A | 9/2000 | Boyle et al. |
| 6,961,852 | B2 * | 11/2005 | Craft ........................ 713/168 |
| 7,203,844 | B1 | 4/2007 | Oxford |
| 7,409,570 | B2 | 8/2008 | Suzuoki |
| 2004/0003262 | A1 * | 1/2004 | England et al. ............ 713/189 |
| 2004/0054907 | A1 | 3/2004 | Chateau et al. |
| 2005/0021944 | A1 * | 1/2005 | Craft et al. .................. 713/161 |
| 2005/0182948 | A1 | 8/2005 | Ducharme |
| 2006/0015754 | A1 | 1/2006 | Drehmel et al. |
| 2006/0129848 | A1 | 6/2006 | Paksoy et al. |
| 2006/0200680 | A1 | 9/2006 | Ellison et al. |

FOREIGN PATENT DOCUMENTS

| CN | 1574730 | 2/2005 |
| JP | 2005018770 | 1/2005 |

OTHER PUBLICATIONS

White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
U.S. Appl. No. 60/650,754, filed Feb. 7, 2005, Akiyuki Hatakeyama.
U.S. Appl. No. 11/345,848, filed Feb. 2, 2006, Hatakeyama et al.
U.S. Appl. No. 11/346,848, 2 pages.

* cited by examiner

*Primary Examiner* — Jacob C. Coppola
(74) *Attorney, Agent, or Firm* — Stephen J. Walder, Jr.; Matthew B. Talpis

(57) ABSTRACT

Mechanisms that provide a sealed storage in a data processing device are provided. Processors of the data processing device may operate in a hardware isolation mode which allows a process to execute in an isolated environment on a processor and associated memory thereby being protected from access by other elements of the data processing device. In addition, a hardware controlled authentication and decryption mechanism is provided that is based on a hardware core key. These two features are tied together such that authentication occurs every time the isolation mode is entered. Based on the core key, which is only accessible from the hardware when in isolation mode, a chain of trust is generated by providing authentication keys for authenticating a next piece of software in the chain, in each piece of software that must be loaded, starting with the core key.

28 Claims, 4 Drawing Sheets

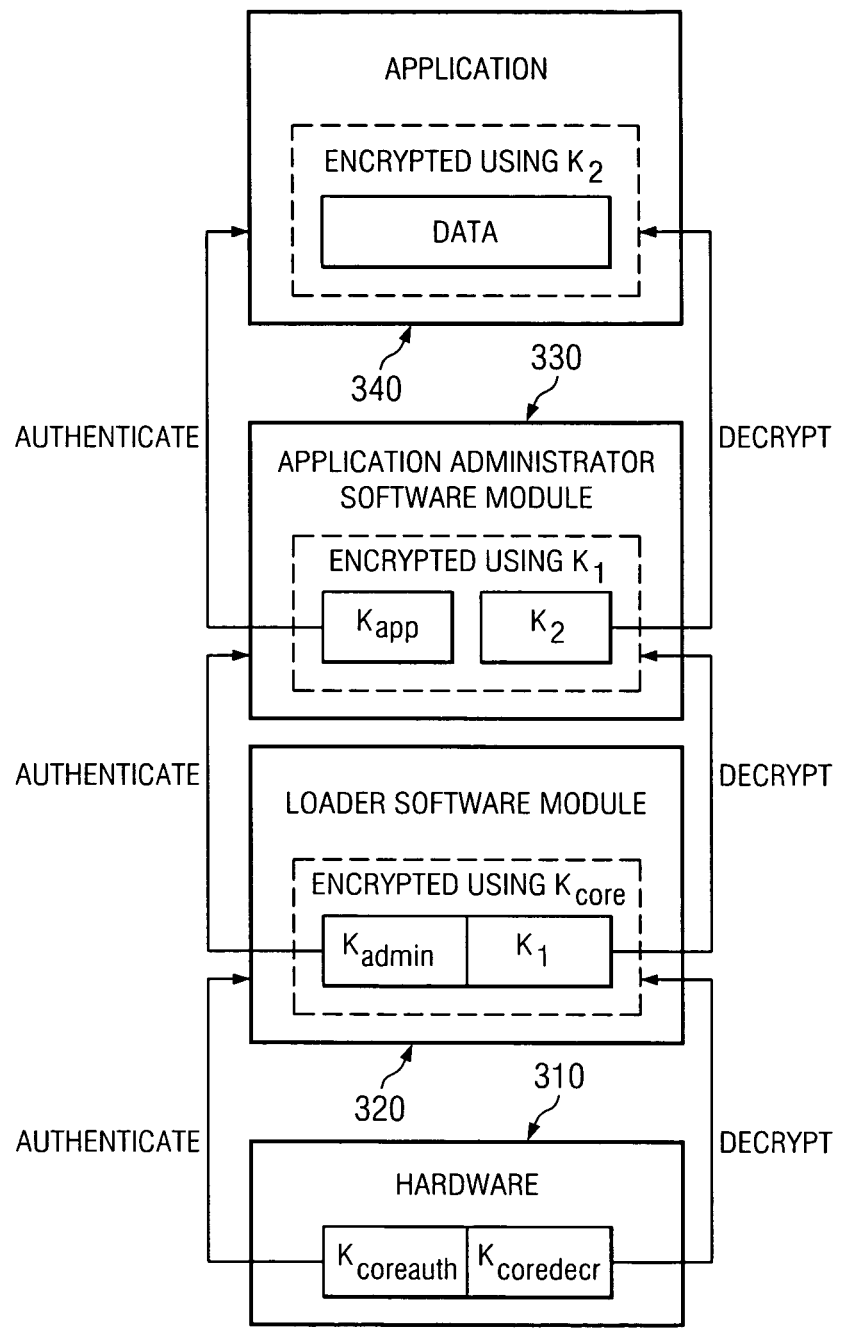

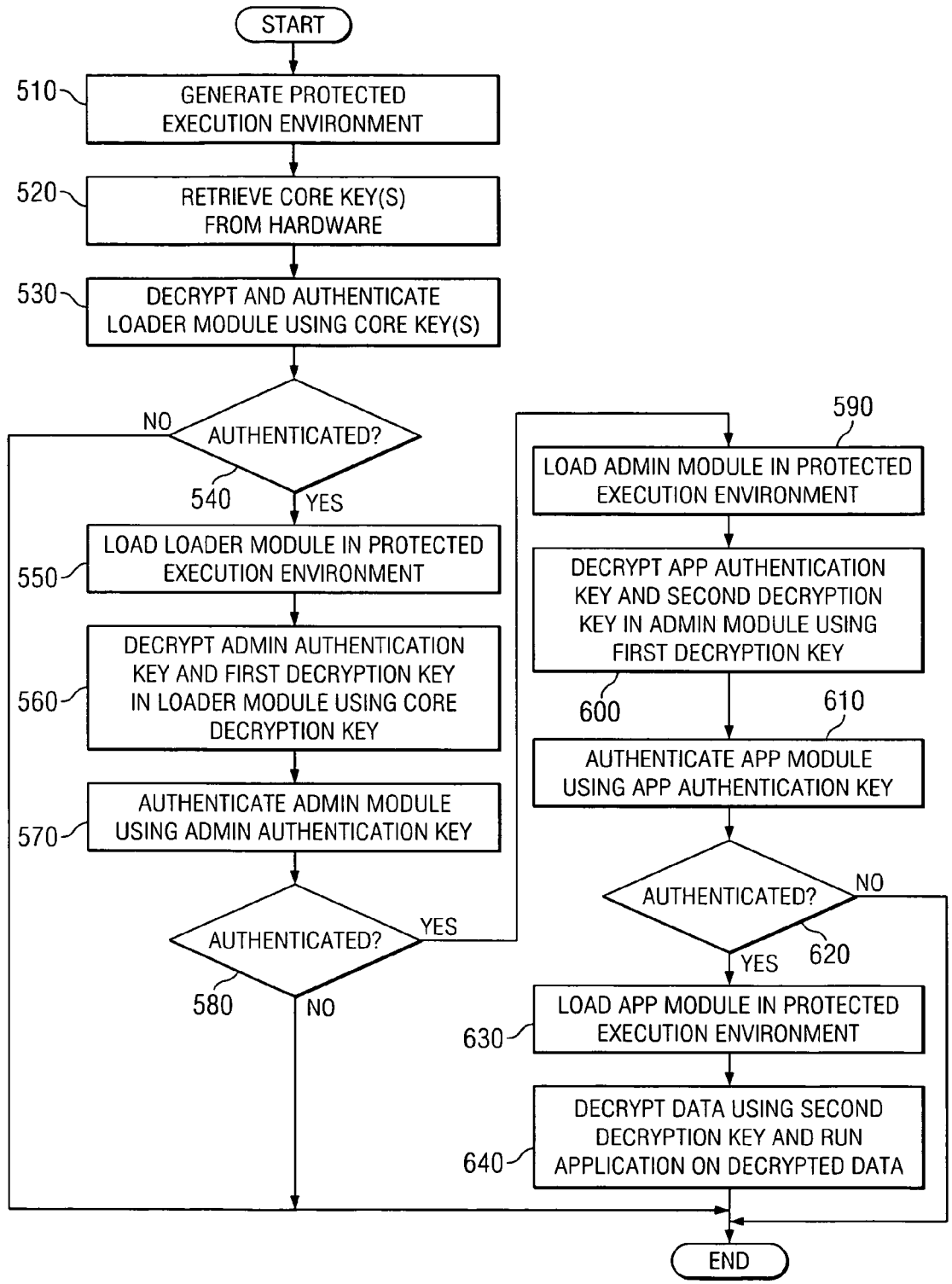

US 8,438,658 B2

PROVIDING SEALED STORAGE IN A DATA PROCESSING DEVICE

BACKGROUND

1. Technical Field

The present application relates generally to an improved data processing device. More specifically, the present application is directed to an apparatus and method for providing sealed storage in a data processing device.

2. Description of Related Art

Maintaining the secrecy of sensitive data in computing systems is a consistent problem in today's computer-centered society. Problems associated with identity theft, corporate espionage, hacking, and the like, are on a rise. Various measures, e.g., encryption mechanisms, certification mechanisms, and the like, have been devised for making it more difficult for unauthorized users, programs, and the like, to access sensitive data.

One endeavor to attempt to create a more secure computing environment is the development of "Trusted Computing" by International Business Machines, Inc. (IBM) and the Trusted Computing Group (TCG), a consortium of several companies that aims to standardize a hardware module and a software stack that enable attestation, i.e. the ability to prove the integrity of a cryptographic co-processor to remote systems, and other security services necessary for verifying system integrity. In one version of "Trusted Computing," the hardware of a computing device includes a passive monitoring component that stores a hash of a machine state on start-up. This hash is computed using details of the hardware (audio card, video card, etc.) and the software (O/S, drivers, etc.). If the computing device ends up in the 'approved' state, the hardware may make available to the operating system the cryptographic keys needed to decrypt trusted applications and data. If the computing device ends up in a 'wrong' state, the hash will be wrong and the hardware will not release the right cryptographic key. The computing device may still be able to run non-trusted applications and access non-trusted data, but protected applications and data will be unavailable and hence unusable.

The current "Trusted Computing" solutions provided by IBM work very well in existing computing environments and provide a mechanism by which data and applications are cryptographically linked to a specific hardware and software environment that would be very difficult for an unauthorized individual to replication. However, with the advent of new computing architectures, opportunities for improving upon known security mechanisms and "Trusted Computing" solutions are made available.

SUMMARY

The illustrative embodiments provide an apparatus, system, and method for providing sealed storage in a data processing device. Sealed storage is a security measure whereby data is encrypted and stored such that it can only be decrypted and accessed if the software and hardware environment are in an expected configuration. Sealed storage protects against data theft attacks where data is copied and accessed in a different environment.

The illustrative embodiments provide such a sealed storage in a data processing device that has one or more processors having a locally accessible memory and an isolation mode of operation. One such data processing device may be a Cell architecture data processing device in which there is one control processor and one or more co-processors that each have a local store and may operate in an isolation mode. In the isolation mode of operation, a hardware implemented isolation mechanism is utilized such that a process can execute in an isolated environment on a co-processor and associated memory thereby being protected from access by other elements of the data processing device, e.g., other processors and functional units of the data processing device.

In addition to the isolation mode of operation, a hardware controlled authentication mechanism is provided that is based on a hardware root of trust, i.e. a hardware authentication key. A chain of trust is started with this authentication mechanism within the isolated environment of the co-processor and associated local store by requiring a series of authentication checks to ensure that each successive software module has (1) not been tampered with and/or (2) is authorized to execute in this environment. Although the authentication checks for the second software module and beyond are implemented in software, it is critical that the first or the primary authentication is implemented in and is controlled by hardware. This is to ensure that the root of trust cannot be modified and manipulated.

The two features of isolation and authentication are tied together by the mechanisms of the illustrative embodiments such that authentication occurs every time the isolation mode is entered. Furthermore, the hardware root or core key for authentication (hereafter referred to as the "core" authentication key) are only accessible from the hardware when the co-processor is operating in isolation mode. The core authentication key is used to authenticate a first software module that is loaded in the isolated environment. This authentication verifies that the first software module has not been modified and is not "rogue" software. Once this first software module is authenticated, it can be trusted to authenticate or check the second software module and so on. In this way, the trust system expands to include more and more software and the entire software stack that is active in the co-processor can be trusted.

In addition to the above, an additional feature of the illustrative embodiments is a hardware controlled decryption mechanism and a hardware root of secrecy. This root of secrecy, which is implemented as a hardware decryption key (hereafter referred to as the core decryption key), is used by the hardware decryption facility to decrypt data. The decrypted data is placed within the isolated co-processor's protected environment by the hardware-controlled decryption facility. Thus, any encrypted data that requires the core decryption key for decrypting into plaintext (unencrypted) form, whereby it can be used or executed, is only in this useful and vulnerable form within the protection of the isolated co-processor.

This system of secrecy can be expanded to include secondary keys, tertiary keys and beyond as follows. The secondary keys are decrypted by the core decryption key via the hardware decryption facility. The secondary keys can be used to decrypt a third tier of keys by a software-implemented decryption mechanism, and so on. Because access to the core decryption key is needed to start this "unwrapping" of a tree of keys, the core decryption key is considered to be the root of secrecy. Without access or knowledge of this root, none of the keys are in a usable form (i.e. they are still encrypted) and are thereby protected from a malicious agent.

The two features of authentication and decryption are combined together as described in the following system architecture. The first software module, e.g., a loader application, has an encrypted portion that contains a pair of security keys. A first security key in the pair of security keys may be an authentication key for authentication of a second software module, e.g., an administration program. The second security key in the pair of security keys may be a decryption security key for decrypting a portion of the second software module.

The encrypted portion of the first software module may be decrypted using the core decryption key. Once the first software module is authenticated using the core authentication key, the encrypted portion of the first software module is decrypted using the core decryption key and the decrypted secondary authentication key is used to authenticate the second software module when the second software module is loaded into the isolated environment. Similarly, the decrypted secondary decryption key in the decrypted portion of the first software module may be used to decrypt a portion of a second software module and/or the authentication and decryption keys for the third software module. In this way, a particular order of software execution is required before a particular portion of data or an application may be decrypted and processed in the isolated environment.

As mentioned above, both the core decryption and authentication keys are only accessible from within the isolated environment generated by the co-processor being in an isolation mode of operation. As a result, external devices and applications may not access the core keys. As a result, external devices and applications cannot decrypt the security keys required for processing applications and data in the software stack.

Furthermore, only software that has been authenticated (by the core authentication key either directly or indirectly through a chain of authentication) may access the security keys (which are decrypted either directly or indirectly by the core decryption key). Therefore, tampered or compromised software cannot access the highly sensitive security keys.

Moreover, cryptographic hashing, i.e. hashing in which only entities having knowledge of the hash key may correctly generate a hash value, may be used to generate an authentication value that is based on the core key and the first software module. Similarly, hashing may be used to generate authentication values based on the other security keys used for authentication and the application and/or data that they are intended to authenticate. In this way, any modification of the applications and/or data will result in an incorrect hash value being generated and the authentication check will fail.

The combination of the isolation environment generated by the isolation mode of the co-processor and associated local memory and the authentication and decryption mechanisms of the illustrative embodiments provides a sealed storage in that data and applications are only accessible within an isolated environment and only when a particular software stack is present. With the mechanisms of the illustrative embodiments, applications/data are only accessible in a hardware protected environment, i.e. an isolation environment, where all executing software from the time when the processor entered the initial isolation state has been authenticated and protected. The applications/data cannot be accessed in any other environment or on any other hardware.

With the illustrative embodiments, an unauthorized individual, program or the like, may not access the sensitive data/applications because they cannot decrypt the data/applications outside the isolated environment and cannot simply copy the data/applications to another environment and be able to access them. By requiring a particular chain of software in the software stack before a particular application/portion of data is accessible in the isolated environment, the software environment may be verified as not having been tampered with before loading of the application/portion of data. Furthermore, since it is impossible to decrypt the applications/data unless the applications/data are residing in the isolated environment of the co-processor and local memory, the applications/data are protected from tampering after loading of the applications/data. In addition, snooping of the processing of the application/data and copying of the decrypted application/data is prevented by way of the isolated environment.

In one illustrative embodiment, a method is provided for implementing a sealed storage. The method may comprise generating a protected execution environment comprising a portion of a local memory and an associated processor of the data processing device. The protected execution environment may be accessible by the processor but may not accessible by devices external to the protected execution environment. A software stack may be generated within the protected execution environment by authenticating and loading one or more pieces of software. A determination may be made as to whether the software stack has a specific configuration required for accessing a portion of information. The portion of information within the protected execution environment may be accessed only if the software stack has a specific configuration required for accessing the portion of information.

Generating a software stack within the protected execution environment may comprise retrieving an on-chip core authentication key from hardware that is hardwired into the data processing device and using the on-chip core authentication key to authenticate and load a first piece of software required to load other pieces of software in the software stack. The on-chip core authentication key may only be accessible from the hardware from within the protected execution environment.

The first piece of software may include an encrypted portion that comprises an authentication key for a next piece of software and/or a decryption key for the next piece of software. The encrypted portion may be encrypted using an on-chip core decryption key. The on-chip core decryption key may only be accessible from the hardware from within the protected execution environment. The on-chip core authentication key and the on-chip core decryption key may be the same core key.

Using the on-chip core authentication key to authenticate and load a first piece of software may comprise generating an authentication value based on the on-chip core authentication key and contents of the first piece of software. Generating an authentication value may comprise generating a hash value of the contents of the first piece of software using a hash function and the core authentication key as a key for the hash function.

Determining if the software stack has a specific configuration required for accessing a portion of information may comprise decrypting software of each layer of software in the software stack using a decryption key from a previous layer in the software stack and performing authentication of each layer of software in the software stack using an authentication key from a previous layer in the software stack. A decryption key from a next to last layer of software in the software stack may be used to decrypt and access the portion of information.

The portion of information may be one of an application or a portion of data to be processed by an application. The processor may be a synergistic processing unit and the local memory may be a local store associated with the synergistic processing unit. Generating a protected execution environment may comprise allocating a portion of the local store for use with an isolation mode of operation of the synergistic processing unit and causing the synergistic processing unit to switch operation to the isolation mode of operation.

The data processing device may be a heterogeneous multiprocessor data processing system having a master processor and one or more co-processors. The master processor and the one or more co-processors may operate using different instruction sets. The data processing device may be a multi-processor system-on-a-chip.

The data processing device may be an integrated circuit device. The integrated circuit device may be part of one of a game machine, a game console, a hand-held computing device, a personal digital assistant, a communication device, a wireless telephone, a laptop computing device, a desktop computing device, or a server computing device.

In another illustrative embodiment, a computer program product is provided that comprises a computer usable medium having a computer readable program. The computer readable program, when executed on a computing device, may cause the computing device to perform the various operations described above with regard to the method illustrative embodiment.

In yet another illustrative embodiment an apparatus for implementing a sealed storage is provided. The apparatus may comprise a processor and a memory coupled to the processor. The memory may comprise instructions, which when executed by the processor, cause the processor to perform the various operations previous described above with regard to the method illustrative embodiment.

These and other features and advantages of the present invention will be described in, or will become apparent to those of ordinary skill in the art in view of, the following detailed description of the exemplary embodiments illustrative of the present invention.

BRIEF DESCRIPTION OF THE DRAWINGS

The novel features believed characteristic of an illustrative embodiment of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating an authentication methodology in accordance with an illustrative embodiment;

FIG. 5 is a flowchart outlining an exemplary operation of one exemplary embodiment illustrative of the present invention for decrypting off-chip security keys using an on-chip core key and decryption mechanism.

DETAILED DESCRIPTION OF THE PREFERRED EMBODIMENTS

The following illustrative embodiment provides an apparatus, system, and method for providing sealed storage in a data processing device. The illustrative embodiment may be implemented in any processor design or architecture in which an "isolated" or "protected" execution environment may be provided that is not accessible by other data processing devices outside the "isolated" or "protected" execution environment. One such processor design or architecture in which the exemplary aspects of the illustrative embodiments may be implemented is the Cell Broadband Engine (CBE) architecture available from International Business Machines, Inc. The CBE architecture is only exemplary of the possible processor architectures in which the illustrative embodiment may be implemented and the description of such in the following detailed description is not intended to state or imply any limitation with regard to the types of processor architectures in which the illustrative embodiment may be implemented.

Figure 1:
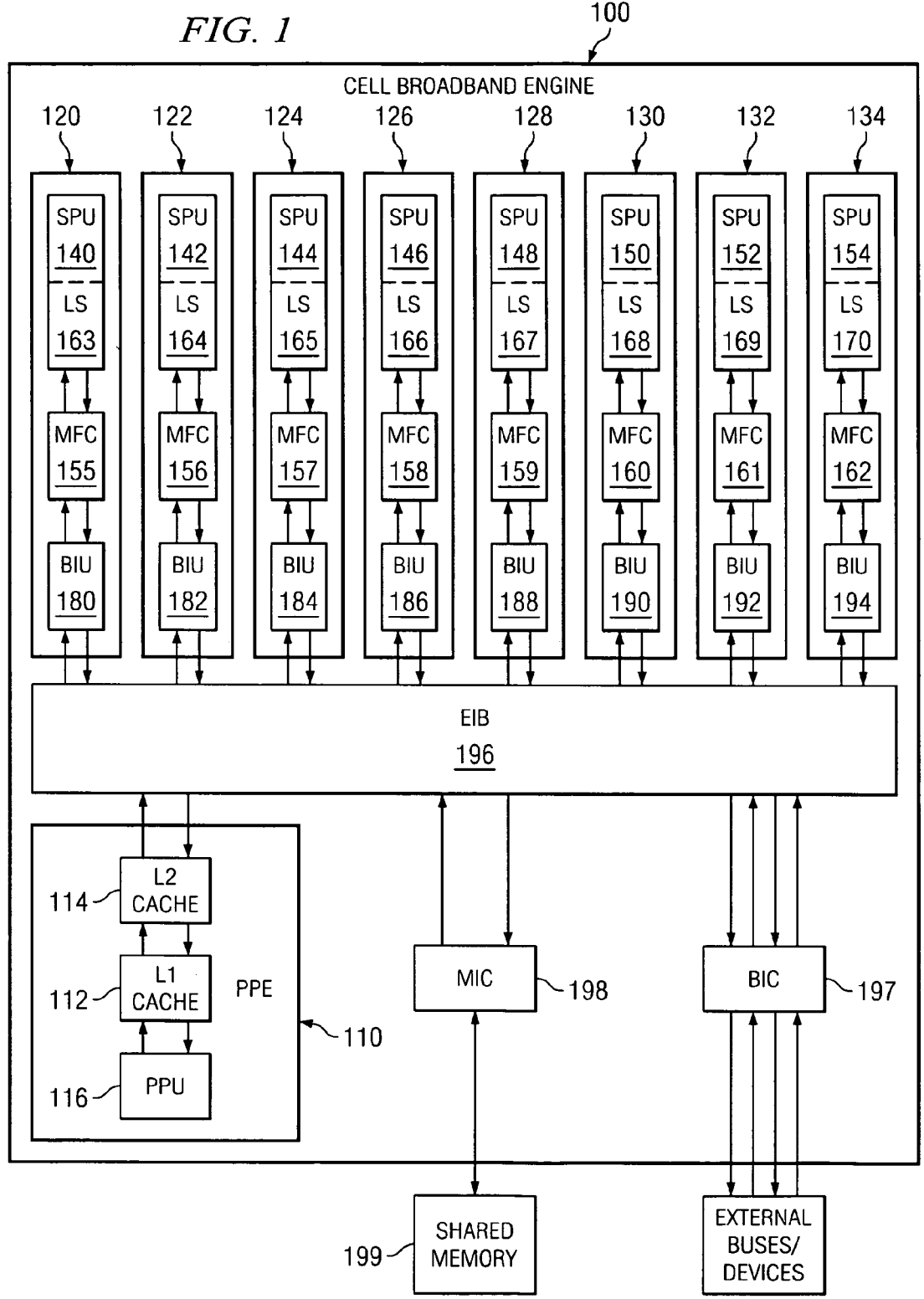
FIG. 1 is an exemplary block diagram of a microprocessor chip in which aspects of an illustrative embodiment may be implemented.

FIG. 1 is an exemplary block diagram of a microprocessor chip in which aspects of the illustrative embodiment may be implemented. The depicted microprocessor chip is one example of a CBE architecture in which exemplary aspects of the illustrative embodiment may be implemented. As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPUs execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the illustrative embodiments, an on-chip key storage, which stores core or root key(s), an on-chip authentication mechanism, and on-chip decryption mechanism are provided in the hardware of the microprocessor or system-on-a-chip, e.g., the Cell Broadband Engine 100. The on-chip key storage, on-chip authentication mechanism, and on-chip decryption mechanism may be provided anywhere on the microprocessor or system-on-a-chip. In one exemplary embodiment, the authentication mechanism, decryption mechanism and the core key(s) are embedded in the PPE 110. In another embodiment, the authentication mechanism, decryption mechanism and/or the core key(s) are provided in an independent unit coupled to the EIB 196. In this case, the authentication mechanism and decryption mechanism have the capability to cryptographically secure communications with other units over the EIB 196. In another possible embodiment, the authentication mechanism, decryption mechanism and the core key are solely controlled by the SPEs 120-134.

With the mechanisms of the illustrative embodiments, the core key is only accessible by a processor, e.g., a SPU, of the microprocessor or system-on-a-chip when the processor is operating in an isolation mode of operation. The isolation mode of operation is used to generate a protected execution environment. This isolation mode of operation essentially permits hardware to isolate a portion of a local store associated with a processor so that a protected execution environment is created. When isolated, the isolated portion of the local store cannot be accessed by any other device except the associated processor. The authentication and decryption of applications/data using the authentication mechanism, decryption mechanism, and the core key stored on-chip, may be performed within this protected execution environment, as described in greater detail hereafter. As a result, the integrity of the application/data is ensured.

An example of such an isolation mode of operation is described in co-pending and commonly assigned U.S. Patent Application Publication 2005/0021944, entitled "Security Architecture for System on Chip," filed on Jun. 23, 2003 and published Jan. 27, 2005, which is hereby incorporated by reference. As described in this co-pending U.S. Patent application, a mechanism for the authentication of code through the partitioning of a local store (LS) into an isolated section and a non-isolated section is provided. The mechanism includes a load/exit state machine (LESM) that contains a core key which is used during a load state machine command. The core key is not otherwise accessible, and can be unique to each system.

Generally, with the system of this co-pending U.S. Patent application, secure processing is performed within the isolated section memory area of the LS. The memory inside the isolated section is addressable only by the associated processor. However, other processors may access memory in the general access area. In other words, the processor can issue load and store commands to memory locations in the local store in either isolated or non-isolated state, but other processors are restricted to issuing commands to the non-isolated region.

Commands to the processor may include the "load" and "exit" commands, as well as a variety of other commands including starting and stopping the processor and a variety of commands for debug purposes. All commands that provide direct access to the register file, external debug and control functions or other state functions of the processor, that are protected in the isolated state, are disabled when the processor is in an isolated state.

The isolated section of the LS may be invoked by a "load" command, and be released by an "exit" command. When the "exit" command is issued, the entire LS becomes general access memory. The load command partitions the LS into a general access section and an isolated section. The load command additionally may transfer code and/or data (load image) from the system memory to the isolated region of the local store, and may initiate authentication and/or decryption of this code and data using the core key, as described in greater detail hereafter. Authentication and/or decryption can be performed by such algorithms and functions as secure hash algorithm (SHA), data encryption standard (DES) or Rivest, Shamir and Adleman algorithm (RSA), but those of skill in the art understand that other authentication and decryption functions and algorithms are within the scope of the present invention.

With the illustrative embodiment, when code/data is loaded into the isolated region of the LS, decrypted and authenticated, the load/exit state machine, which may be provided as part of the decryption mechanism, may start execution of the processor at an address within the loaded image in the isolated region of the LS. The isolation section, i.e. the protected portion of memory, limits access to sensitive data and code within the isolated section to commands issued from the processor. Generally, the partitioning of the LS into a general section and isolated section avoids any other device other than the processor from copying, modifying or otherwise corrupting any code or data stored within the isolated section.

The exit function, invoked by the exit command, is the only way in which the isolated region of the LS can be released to be used as contiguous with the general access section. The exit command also erases all information in the isolated section before releasing the isolated state to the general access section. The erasure can occur even if the processing within the system is otherwise in a stopped, paused or aborted condition.

When the processor is operating in an isolation mode, the decryption mechanism associated with the processor may access the core decryption key stored on-chip and may use the core decryption key to decrypt applications/data in the protected execution environment and place the decrypted applications/data into the protected portion of the local store. The core key(s) may comprise one or more keys that are used for authentication and/or decryption. In one illustrative embodiment, two core key(s) are provided, one for authentication and another for decryption. In another alternative embodiment, a single core key is utilized for both authentication and decryption. Any number of core keys may be used without departing from the spirit and scope of the present invention depending upon the particular implementation.

As described in more detail hereafter, with the illustrative embodiments, sensitive software that is to be executed in a protected execution environment is stored outside of the protected execution environment with an encrypted portion that contains an authentication security key and a decryption key. The software itself may also be encrypted in order to ensure the security of the software.

The authentication security key and decryption key are stored in the software in such a manner that a chain of execution is established. In other words, in order to access particular software, the particular software's authentication security key must be accessible in the protected execution environment. This authentication security key may be stored in an encrypted manner in hardware or another piece of software that is required to be loaded prior to the software that is being accessed. The software being accessed may in turn have an encrypted portion that stores the decryption key for an encrypted portion of software or data that is to be loaded after the software being accessed.

Using the above mechanisms, a particular order of loading of software in the protected execution environment is required for software and data to be accessible. Preferably, the first piece of software that is required to be loaded in the protected execution environment has its authentication security key encrypted using a core decryption key stored in the hardware of the microprocessor or system-on-a-chip. This ensures that this first piece of software, and any software or data loaded thereafter, is loaded in a protected execution environment of the microprocessor or system-on-a-chip. If the encrypted software or data is copied to another data processing device by an unauthorized individual or process, the software or data will not be accessible because the other data processing device will not have access to the core decryption key.

In addition, the first piece of software must be authenticated using a hardware implemented core authentication key (which in some illustrative embodiments may be the same key as the core decryption key). This core authentication key should be used to generate a cryptographic hash over the complete contents of the first piece of software, e.g., a SHA-1 hash of the first piece of software (either including or excluding the encrypted portion). The calculated signature may be used to ensure that the first piece of software is not corrupted prior to loading in the protected execution environment and to ensure that the software is authorized to execute in the isolated environment.

Once decrypted and authenticated, the security keys provided in the encrypted portion of the first piece of software may be used to decrypt and authenticate a subsequent piece of software that is to be loaded in the protected execution environment. This process may then be repeated for each subsequent level of software/data loaded into the protected execution environment.

Thus, not only is a protected execution environment required, but a particular arrangement of the software stack in the protected execution environment is required in order for software and data to be accessible. As a result, the software and data are secure prior to loading due to encryption of the software and data in a manner that requires a protected execution environment with access to the core key. The software and data are secure during loading of software and data by way of encrypted authentication security keys that are only accessible in the protected execution environment and which ensure that the software and data being loaded has not been tampered with. Moreover, the software and data are secure after loading by way of the hardware mechanisms that prevent access to a protected execution environment by processors, devices, and applications outside the protected execution environment.

Figure 2:
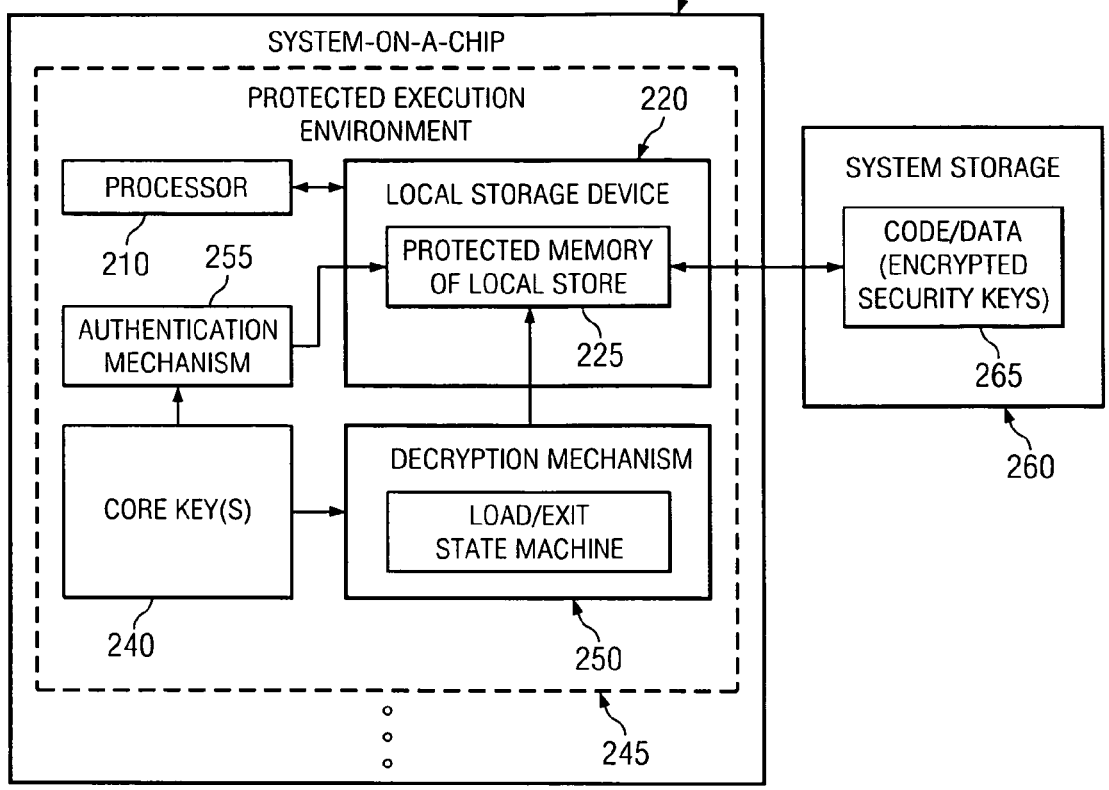
FIG. 2 is an exemplary diagram illustrating an interaction of the primary operational components of an illustrative embodiment using on-chip core key(s), an on-chip authentication mechanism, and an on-chip decryption mechanism.

FIG. 2 is an exemplary diagram illustrating an interaction of the primary operational components of the illustrative embodiment when using on-chip core key(s), an on-chip authentication mechanism, and an on-chip decryption mechanism. As shown in FIG. 2, a system-on-a-chip 200, in accordance with one exemplary embodiment illustrative of the present invention, includes a processor 210 (such as a SPU in the case of a Cell Broadband Engine), a local storage device 220, on-chip core key(s) 240, an on-chip decryption mechanism 250, and an on-chip authentication mechanism 255. Also provided in the system, but off-chip, is a system storage 260 which may store code, such as software applications, and data 265 which may be encrypted or have encrypted portions that include authentication security keys and decryption keys.

The processor 210, executing instructions of an application or the like, may require that secure operations be performed on code and/or data loaded into local storage device 220, e.g., code/data 265 obtained from system storage 260. As a result, the processor 210 may issue an instruction to the local storage device 220 to generate a protected portion of local store 225 for use in performing such secure operations. A protected portion of local store 225, in terms of the illustrative embodiment, is a portion of local storage 220 that is only accessible by the processor 210 and may not be accessed by processors or other devices located either on-chip or off-chip. As described above, such a protected portion of local store 225 may comprise an isolated section of the local storage device 220, for example.

Once this protected portion of local store 225 is established, a designated piece of software may be authenticated and loaded into the protected portion of local store 225. For example, in one illustrative embodiment, a loader module is always loaded first when the protected portion of local store 225 is generated and is started by the hardware, e.g., processor 210. This loader module is coded such that it is used to load other software in the protected portion of local store 225 of the protected execution environment 245. The loader module is authenticated and decrypted using the core key(s) 245 and decryption and authentication mechanisms 250 and 255. As a result, the loader module cannot be authenticated, decrypted and loaded outside of the protected execution environment 245 since access to the core key(s) 240 is not possible outside the protected execution environment 245.

The core key(s) 240 may include a decryption core key and an authentication core key (which in one illustrative embodiment are the same core key). The decryption core key may be used to decrypt the first piece of software to be loaded into a protected execution environment, e.g., the loader module. The authentication core key may be used to authenticate the first piece of software to be loaded into the protected execution environment, e.g., the loader module.

The authentication core key in the core key(s) 240, as well as other authentication security keys discussed hereafter, only need to be randomly generated for a symmetric key cryptographic algorithm for example. By using a cryptographic hash value as the authentication check, modified software cannot be authenticated using the same hash value. Thus, for example, any change to the loader module will cause a different hash value to be generated. Therefore, when the authentication mechanism 255 generates a hash value based on a modified loader module, it will not match the hash value attached with the loader module and the authentication mechanism 255 will not permit the modified loader module to be loaded into the protected portion of local store 225. Furthermore, an adversary cannot generate and attach a new hash value in order to attempt to adjust for the modified loader module because knowledge of the core key is necessary to generate a matching hash value. The adversary does not have access to the core authentication key. This ensures the integrity and authenticity of the loader module prior to the loader module being loaded and started in the protected execution environment 245.

Once the initial piece of software, e.g., the loader module, is decrypted and authenticated using the on-chip core key(s) 240, loaded into the protected portion of local store 225, and started by the processor 210, the initial piece of software may load other software and data. This other software and data may be obtained from system storage 260 or another on-chip or off-chip code/data source, such as a CD-ROM, floppy disk, magnetic tape, hard drive, or the like, into the protected portion of local store 225. In the process of loading this other software and/or data, the other software and/or data is authenticated based on an authentication security key stored in an encrypted portion of the initial piece of software. This encrypted portion of the initial piece of software is encrypted using the core decryption key of the core key(s) 240 for a symmetric key algorithm or a complementary key for an asymmetric key algorithm and an encryption algorithm corresponding to decryption mechanism 250, for example.

If the authentication of this other software and/or data succeeds, the software/data may be decrypted using a decryption key stored in the encrypted portion of the initial piece of software and loaded into the protected portion of local store 225 for processing in the protected execution environment 245. This other software itself may contain an encrypted authentication security key and decryption key for authenticating and decrypting a third piece of software or data. This may continue with any number of levels of software and/or data being used. As a result, a chain of software/data is required for a particular piece of software or portion of data to be accessed. That is, since each piece of software or portion of data is encrypted and authenticated using security keys that are present in software/data that must be previously loaded, a particular arrangement of software/data in a software stack of the protected execution environment 245 is required in order to access a desired piece of software or data.

The decryption and authentication operations described above for the first layer of authentication and decryption are preferably performed in on-chip decryption and authentication mechanisms such as decryption mechanism 250 and authentication mechanism 255. In one illustrative embodiment, the decryption mechanism 250 and authentication mechanism 255 are hardwired into the chip circuitry. The decryption mechanism 250 and authentication mechanism 255 may be completely implemented in transistor logic or, alternatively, may leverage the arithmetic capabilities of the processor, in which case, the corresponding sequence of processor instructions may be hardwired into the chip circuitry. Thus, in an illustrative embodiment, the decryption mechanism 250 and authentication mechanism 255 operates on a hardware level rather than a software level.

It should further be noted that while two separate mechanisms are depicted for authentication and decryption, the present invention is not limited to such an embodiment. To the contrary, the authentication and decryption mechanisms may be combined into a single unit or be distributed into more than two units without departing from the spirit and scope of the present invention.

The decryption and authentication mechanisms of the illustrative embodiments are better understood with reference to the following example. In this example, to launch an application, it is assumed that the software stack inside a processor element, such as a SPE, is to first load and start a Loader module, which in turn loads an application administrator module (Admin), which in turn loads the desired application (App). It should be noted that while three layers are used in the software stack of this example, the present invention is not limited to such. Rather, any number of layers in the software stack may be used with the illustrative embodiments without departing from the spirit and scope of the present invention.

The decryption and authentication of these layers of the software stack will be described with reference to FIG. 3. As shown in FIG. 3, when the SPE enters the isolation mode of operation, the first portion of code that the SPE executes is the Loader module 320. The Loader module 320 is decrypted using the core decryption key $K_{coredecr}$ and the on-chip decryption mechanism. A hash value on the Loader module 320 is generated by the on-chip authentication mechanism using the core authentication key $K_{coreauth}$ retrieved from the hardware 310 and this hash value is compared with the attached hash value. If the two match, then the Loader module 320 is authenticated and may be loaded into the protected portion of the local store and executed by the SPU. If the Loader module 320 has been modified from a state when the attached hash value was created, then the Loader module 320 will not be authenticated and cannot be loaded and executed by the SPU.

Again, it is noted that the core key(s) $K_{coreauth}$ and $K_{coredecr}$ are only accessible within the protected execution environment is created by the hardware 310 when the SPE operates in the isolation mode of operation. Furthermore, while the exemplary embodiments use a cryptographic hash value (using the core authentication key $K_{coreauth}$ in an algorithm like Cipher Block Chaining Mode AES) of the initial software module that is to be loaded into the protected execution environment as the value to be checked, the present invention is not limited to such. Rather, any type of key mechanism may be used so long as the core authentication key $K_{coreauth}$ may be used to authenticate the initial software module that is to be loaded in the protected execution environment.

The Loader module 320 includes a first encrypted authentication security key $K_{admin}$ and a first encrypted decryption key $K_1$. The first authentication security key $K_{admin}$ and first decryption key $K_1$ are encrypted using the core decryption key $K_{coredecr}$, which is only accessible from the hardware within the protected execution environment. The first authentication security key $K_{admin}$ and the first decryption key $K_1$ may be decrypted using the core decryption key $K_{coredecr}$, following authentication of the Loader module 310 using the core authentication key $K_{coreauth}$, and stored in the protected portion of the local store. Thereafter, when the Loader module 320 loads the application administrator module 330, the first authentication security key $K_{admin}$ may be used to authenticate the application administrator module 330 in a similar manner as the core authentication key $K_{coreauth}$ was used to authenticate the Loader module 320.

Once authenticated, the application administrator module 330 may be decrypted by the first decryption key $K_1$, loaded into the protected portion of the local store, and executed by the SPU. The application administrator module 330 may in turn load the application 340 through a similar authentication and decryption process using the second authentication key $K_{app}$ and second decryption key $K_2$ that are stored in an encrypted manner in the application administrator module 330. Data used by application may also be decrypted using the second decryption key $K_2$.

Thus, in order for the desired application 340 to be accessible and the data for the application 340 to be accessible, the Loader module 320 must first be authenticated and executed, the application administrator module 330 must then be authenticated and executed, and the application 340 must then be authenticated prior to being accessed. In other words, a chain of authentication and decryption is created by the mechanisms of the illustrative embodiments, with the chain originating with core key(s) that are only accessible from hardware in a protected execution environment. The chain requires a specific order of loading and execution of software in the software stack in order for the desired application and/or data to be made accessible. Moreover, even with this chain in place, the application and/or data may only be accessed within the protected execution environment.

The illustrative embodiments provide many advantages over known methods of security of applications and data. Other methods of security use keys that are not linked with the hardware. These other methods allow unauthorized individuals to possibly unseal or access the applications and data outside of a protected execution environment. With the illustrative embodiments, mechanisms are provided such that the applications and data cannot be accessed outside of the protected execution environment generated when the processor is operating in isolation mode. As a result, while an unauthorized individual may obtain a copy of the applications or data in their encrypted form, the unauthorized individual will not be able to access the decrypted form of the applications or data since the unauthorized individual will not be able to obtain the core key(s) or recreate the software stack chain that is required to obtain access to the keys that will decrypt the applications or data.

Moreover, with known security methods, although decrypting can sometimes be limited to being performed in a verified environment, the decrypted applications or data are still vulnerable since the verified environment is not isolated from access by external devices, applications, and the like. With the mechanisms of the illustrative embodiments, since the applications and data may only be accessed within a protected execution environment that is isolated, via hardware means, from access by external devices, applications, and the like, the security of the applications and data after unsealing or decrypting is maintained and the decrypted applications and data may not be copied outside of the protected execution environment.

Furthermore, the software stack that is verified through the mechanisms of the illustrative embodiments is much smaller than the entire software stack of the data processing system. This is because the only software stack that is verified is the software stack associated with the protected execution environment. Software executing elsewhere in the data processing system, or elsewhere on the system-on-a-chip, even if hacked, cannot observe or modify the applications or data within the protected execution environment. Thus, verifying a small application or portion of data is much more feasible than in known security methods that may require verifying or calculating a hash for an operating system and the entire software stack from boot time.

In addition, since known security mechanisms do not operate within an isolated or protected execution environment, once the application or data is authenticated, it becomes vulnerable to tampering. With such known security mechanisms it is impossible to guarantee that tampering will not happen between code or data authentication and when the code or data needs to be "trusted," i.e. the relevant memory region can be corrupted after verification, for example. With the mechanisms of the illustrative embodiments, hardware isolation of the protected execution environment of the SPE eliminates this vulnerability.

Figure 4:
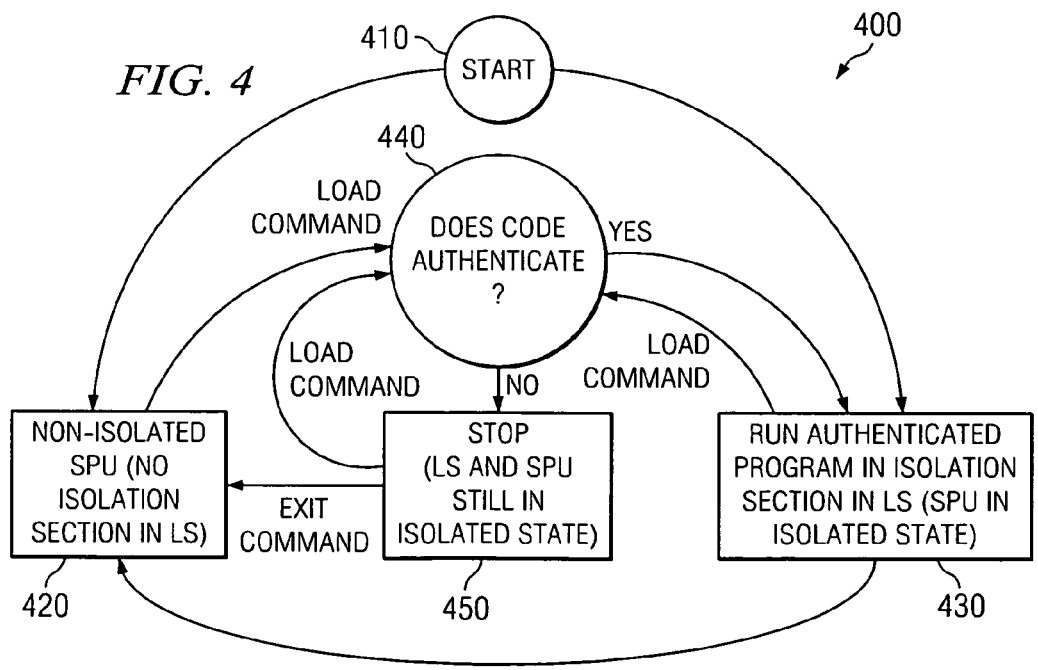
FIG. 4 is an exemplary diagram illustrating transitions between isolated and non-isolated states as initiated by a processing unit in accordance with one illustrative embodiment.

From the above, it can be seen that many of the advantages of the illustrative embodiments stem from the ability of the processing unit to operate in an isolated mode of operation. Specifically, many of the advantages are due to the ability of the processing unit to generate an isolated and protected execution environment in which to perform the authentication and decryption according to the required chain of authentication and decryption. FIG. 4 is provided as an example state diagram illustrating how a processing unit may initiate and exit from such an isolated mode of operation.

FIG. 4 is an exemplary diagram illustrating transitions between isolated and non-isolated states as initiated by a processing unit in accordance with one exemplary embodiment illustrative of the present invention. As shown in FIG. 4, in the state diagram 400, after a start transition 410 occurs, the state diagram then advances to a non-isolated state 420 or isolated state 430 depending on the initial system configuration. For the purpose of clarity, state diagram 400 is described as first advancing to state 420. However, those of skill in the art understand that the state diagram 400 can step to either state 420 or to state 430.

In state 420, the LS, e.g., local storage device 220, does not have an isolated section, e.g., protected portion of memory 225. Instead, the entire LS is in the general access state. The processor, e.g., processor 210, is referred to as being in a non-isolated state. Generally, this means that the processor has not been ordered to create an isolation section inside the LS.

Thereafter, to initiate either a secure loader or a secure application, as appropriate, the processor, or a control processor, such as the PPU 116, issues the load command. In transition 440, through employment of the core key(s), a load image consisting of code and/or data is loaded, authenticated and/or decrypted. In one embodiment, this load image is a secure loader, responsible for loading, authenticating, and decrypting, secure applications and their corresponding data.

In the transition to state 430, after the load command is issued by the processor but before the authentication of the code, any instructions processing on the local processor have been discontinued. Also, during the transition to state 430, the processor local to the LS disregards any external processor requests to write to the isolated section of the LS and requests by external processors to read the isolated section of the LS return a value of zero or another constant. The processor creates the isolated section of the LS with access restricted to only local processor initiated load/store commands or instruction fetches. The processor also disables accesses to all of the local processor debug/test/diagnostic interfaces. The non-isolated/general access region of the LS retains the same access rights as when the local processor has not issued a partition command for the isolated section. In addition, the local processor disables its asynchronous interrupt when at least part of the LS is in an isolated state, e.g., when an isolated section is present.

In the transition to state 430, some local processor externally accessible registers are typically accessed to obtain a direct memory access address. The direct memory access address corresponds to a specified point of the image of the code to be loaded to the isolated section of the local processor. After finding the code and/or data to be authenticated and/or decrypted, the isolated section of the LS is written with the code and/or data to be authenticated and/or decrypted.

However, if the loaded code and/or data does not authenticate, state 450 is reached, and further authentication of code/data is discontinued. If there is a failure of authentication, as in state 450, the local processor notifies the control processor, e.g., PPU 116, of the authentication failure, while the local processor remains in the isolated state. As a result, the LS retains the isolated region. In one embodiment, the notification of the control processor is performed by a stop and signal command. However, even after being notified of the authentication failure, the control processor is unable to access the code stored within the isolation section through commands issued to the local processor.

However, if the load image is authenticated, the local processor issues an exit command after the execution of the code image/accessing of the data within the isolated section finishes in state 430. After the local processor issues the exit command, all local processor registers, and the isolated section of the LS, are erased or overwritten. This can be done to ensure that no code/data that was previously within the isolated section can be accessed at the instigation of any device when the isolated section is released back to being contiguous with the general section. Access to the LS is unrestricted, and access to the local processor debug/test/diagnostic interfaces are re-enabled upon completion of the exit process.

Finally, the transition to the non-isolated state of the local processor is completed when the local processor notifies the control processor. This can be done by means of an instruction that halts the local processor and signals the control processor, for example.

After the stop state 450 is entered, the control processor can issue an exit command to the local processor. The exit command leads to releasing the isolated section, and stepping to the state 420. Alternatively, in the stop state 450, the processor, or the control processor, can issue another load command to thereby load in other or different code/data to be authenticated, decrypted, and accessed in the protected execution environment.

It should be noted that while in state 430, the operations of the illustrative embodiments for decrypting, authenticating and loading software/data using the core and encrypted authentication security keys and decryption keys forming the required software stack configuration may be performed in the manner previously described. As shown in FIG. 4, as programs issue load instructions from within the isolated section of the LS, the state transitions to authentication state 440. If at any point a program or portion of data does not pass the authentication performed in step 440, such as based on the authentication security key stored in a previously loaded program, the state may transition to step 450.

FIG. 5 is a flowchart outlining an exemplary operation of one exemplary embodiment illustrative of the present invention for decrypting off-chip security keys using an on-chip core key and decryption mechanism. It will be understood that each block, and combination of blocks, of the flowchart illustration in FIG. 5, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With the illustrative embodiment outlined in FIG. 5, a three layer software stack such as that described above with regard to FIG. 3 is assumed. It will be appreciated that additional steps similar to those shown in FIG. 5 may be added to the outlined flow for additional software stack layers that may be required depending upon the particular implementation of the present invention.

As shown in FIG. 5, the operation starts with a protected execution environment being generated (step 510). The core key(s) are retrieved from the hardware within the protected execution environment (step 520). The loader module is decrypted using a core decryption key and authenticated using a core authentication key (step 530). A determination is made as to whether the loader module was determined to be authentic (step 540). If not, the operation ends and the loader module is not loaded into the protected execution environment. Although not explicitly shown in FIG. 5, an error may be returned to the processor or other device initiating the generation of the protected execution environment to inform the device of the inability to authenticate the loader module.

If the loader module is authentic, the loader module is loaded into the protected execution environment (step 550) and the application administrator authentication key and first decryption key in the loader module are decrypted using the core decryption key (step 560). The application administrator module may then be authenticated using the application administrator authentication key (step 570). A determination is then made as to whether the application administrator module is authentic (step 580). If not, again the application administrator module is not loaded into the protected execution environment and an error may be returned to the processor or other device initiating the protected execution environment.

If the application administrator module is authentic, the application administrator module is loaded into the protected execution environment (step 590) and the application authentication key and second decryption key in the application administrator module are decrypted using the first decryption key (step 600). The application module may then be authenticated using the application authentication key (step 610). A determination is then made as to whether the application module is authentic (step 620). If not, again the application module is not loaded into the protected execution environment and an error may be returned to the processor or other device initiating the protected execution environment.

If the application module is authentic, the application module is loaded into the protected execution environment (step 630). The data used by the application module may then be decrypted using the second decryption key and the application module may be run on the decrypted data (step 640). The operation then terminates.

Thus, the illustrative embodiments provide a security mechanism for ensuring the integrity of applications and data by tying the applications and data to a particular hardware and software configuration. Moreover, the mechanisms of the illustrative embodiments ensure that the applications and data may only be accessed within a protected execution environment that is isolated from access by devices, applications, and the like, that are external to the protected execution environment. In this way, the applications and data are protected from access by unauthorized devices, applications, and the like.

It should be noted that the above illustrative embodiments are provided as examples only and are not intended to state or imply any limitation with regard to the manner by which the mechanisms of the present invention, as outlined in the following claims, may be implemented. For example, while the above embodiments describe the protected portion of memory as being established in a local storage device associated with a processor, the present invention is not limited to such. Rather, the mechanisms of the present invention may be applied with use of any protected portion of memory that is provided on-chip.

In addition, while the illustrative embodiment has been described in terms of a single core key stored in an on-chip core key storage, the present invention is not limited to such. Rather, any number of core keys and sizes of core keys may be used without departing from the spirit and scope of the present invention. The primary concept is that the same architecture of the system-on-a-chip or microprocessor may be used with multiple implementations of data processing systems meeting customer requires regardless of the number of core keys or size of core keys stored on the chip.

Similarly, while the exemplary embodiments have been described in terms of a single decryption mechanism being provided on-chip, the present invention is not limited to such. Rather, any number of decryption mechanisms may be provided on-chip and may be used in a protected execution environment to perform security operations such as decryption and authentication. For example, the encrypted code/data loaded into a protected execution environment may include a bit or series of bits designating an identifier of the encryption algorithm used to encrypt the code/data. This bit or series of bits may be used within the protected execution environment to select a particular on-chip decryption mechanism and/or on-chip core key to be used in performing security operations on the encrypted code/data.

Moreover, while the exemplary embodiments are described as having each SPU of a Cell Broadband Engine store a copy of the core key(s) and each SPU having its own decryption mechanism, the present invention is not limited to such an embodiment. Rather, the core key(s) and decryption mechanism may be provided in one or more devices that are commonly accessible by all of the processors of the system-on-a-chip or microprocessor.

In addition, while the illustrative embodiment has been described in terms of separate devices for storing the core key(s) and providing the decryption mechanism, the present invention is not limited to such an embodiment. Rather, the core key(s) and decryption mechanism may be provided in the same on-chip security device without departing from the spirit and scope of the present invention. Other modifications to the exemplary embodiments described above, as will become apparent to those of ordinary skill in the art in view of the present description, are intended to be within the scope of the present invention as outlined in the following claims.

The mechanisms of the illustrative embodiment, as described above, are part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the illustrative embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing device, for accessing a software application, the method comprising:

generating a protected execution environment comprising a portion of a local memory of the data processing device and an associated processor of the data processing device, wherein the protected execution environment is not accessible by devices external to the protected execution environment;

generating a software stack within the protected execution environment, wherein the generating comprises:

retrieving a core decryption key and a core authentication key, wherein the core keys are hardwired into hardware of the data processing device such that the core keys are not modifiable after being hardwired into the hardware; and decrypting a first software module using the core decryption key, wherein the first software module contains an encrypted first decryption key and an encrypted first authentication key;

authenticating the first software module using the core authentication key, wherein the authenticating comprises generating an authentication value by generating hash value of the contents of the first software module using a hash function, and using the core authentication key as a key for the hash function;

in response to authenticating the first software module, loading the first software module into the protected execution environment;

in response to loading the first software module, decrypting the encrypted first decryption key and the encrypted key using the core decryption key, wherein the decrypting is performed within the protected execution environment;

decrypting a second software module using the first decryption key, wherein the second software module contains an encrypted second decryption key and an encrypted second authentication key;
authenticating the second software module using the first authentication key;
in response to authenticating the second software module, loading the second software module into the protected execution environment;
in response to loading the second software module, decrypting the encrypted second decryption key and an encrypted second authentication key using the first decryption key, wherein the decrypting is performed within the protected execution environment; and
after loading the first and second software modules into the protected execution environment, accessing a software application using the second decryption key and the second authentication key, the software application associated with the first and second software modules.

2. The method of claim 1, wherein the on-chip core decryption key is only accessible from the hardware from within the protected execution environment.

3. The method of claim 1, wherein each piece of software in the one or more pieces of software comprises an encrypted portion that includes an encryption key for a next piece of software in a series of pieces of software in the one or more pieces of software, and wherein the encrypted portion of each piece of software is encrypted using an encryption key of a previous piece of software in the series of pieces of software.

4. The method of claim 1, wherein determining if the software stack has a specific configuration required for accessing a portion of information comprises:
decrypting software of each layer of software in the software stack using a decryption key from a previous layer in the software stack; and
performing authentication of each layer of software in the software stack using an authentication key from a previous layer in the software stack, and wherein accessing the portion of information comprises using a decryption key from a next to last layer of software in the software stack to decrypt and access the portion of information.

5. The method of claim 1, wherein the portion of information is one of an application or a portion of data to be processed by an application.

6. The method of claim 1, wherein the processor is a synergistic processing unit and the local memory is a local store associated with the synergistic processing unit, and wherein generating a protected execution environment comprises:
allocating a portion of the local store for use with an isolation mode of operation of the synergistic processing unit; and
causing the synergistic processing unit to switch operation to the isolation mode of operation.

7. The method of claim 1, wherein the data processing device is a heterogeneous multiprocessor data processing system having a master processor and one or more co-processors, and wherein the master processor and the one or more co-processors operate using different instruction sets.

8. The method of claim 1, wherein the data processing device is a multiprocessor system-on-a-chip.

9. The method of claim 1, wherein the data processing device is an integrated circuit device, and wherein the integrated circuit device is part of one of a game machine, a game console, a hand-held computing device, a personal digital assistant, a communication device, a wireless telephone, a laptop computing device, a desktop computing device, or a server computing device.

10. The method of claim 1, wherein using the on-chip core authentication key to authenticate and load a first piece of software comprises generating the authentication value by generating a hash value of the contents of the first piece of software using a hash function, and using the core authentication key as a key for the hash function.

11. A computer program product comprising a computer usable medium having a computer readable program, wherein the computer readable program, when executed on a data processing device, causes the data processing device to:
generate a protected execution environment comprising a portion of a local memory of the data processing device and an associated processor of the data processing device, wherein the protected execution environment is not accessible by devices external to the protected execution environment;
generate a software stack within the protected execution environment, wherein the software stack is generated by:
retrieving a core decryption key and a core authentication key, wherein the core keys are hardwired into hardware of the data processing device such that the core keys are not modifiable after being hardwired into the hardware; and
decrypting a first software module using the core decryption key, wherein the first software module contains an encrypted first decryption key and an encrypted first authentication key;
authenticate the first software module using the core authentication key, wherein the authenticating comprises generating an authentication value by generating a hash value of the contents of the first software module using a hash function, and using the core authentication key as a key for the hash function;
load, in response to authenticating the first software module, the first software module into the protected execution environment;
decrypt, in response to loading the first software module, the encrypted first decryption key and the encrypted first authentication key using the core decryption key, wherein the decrypting is performed within the protected execution environment;
decrypt a second software module using the first decryption key, wherein the second software module contains an encrypted second decryption key and an encrypted second authentication key;
authenticate the second software module using the first authentication key;
load, in response to authenticating the second software module, the second software module into the protected execution environment;
decrypt, in response to loading the second software module, the encrypted second decryption key and an encrypted second authentication key using the first decryption key, wherein the decrypting is performed within the protected execution environment;
access, after loading the first and second software modules into the protected execution environment, a software application using the second decryption key and the second authentication key, the software application associated with the first and second software modules.

12. The computer program product of claim 11, wherein the on-chip core decryption key is only accessible from the hardware from within the protected execution environment.

13. The computer program product of claim 11, wherein each piece of software in the one or more pieces of software comprises an encrypted portion that includes an encryption key for a next piece of software in a series of pieces of software in the one or more pieces of software, and where in the encrypted portion of each piece of software is encrypted using an encryption key of a previous piece of software in the series of pieces of software.

14. The computer program product of claim 11, wherein the computer readable program causes the data processing device to determine if the software stack has a specific configuration required for accessing a portion of information by:
   decrypting software of each layer of software in the software stack using a decryption key from a previous layer in the software stack; and
   performing authentication of each layer of software in the software stack using an authentication key from a previous layer in the software stack, and wherein accessing the portion of information comprises using a decryption key from a next to last layer of software in the software stack to decrypt and access the portion of information.

15. The computer program product of claim 11, wherein the portion of information is one of an application or a portion of data to be processed by an application.

16. The computer program product of claim 11, wherein the processor is a synergistic processing unit and the local memory is a local store associated with the synergistic processing unit, and wherein generating a protected execution environment comprises:
   allocating a portion of the local store for use with an isolation mode of operation of the synergistic processing unit; and
   causing the synergistic processing unit to switch operation to the isolation mode of operation.

17. The computer program product of claim 11, wherein the data processing device is a heterogeneous multiprocessor data processing system having a master processor and one or more co-processors, and wherein the master processor and the one or more co-processors operate using different instruction sets.

18. The computer program product of claim 11, wherein the data processing device is a multiprocessor system-on-a-chip.

19. The computer program product of claim 11, wherein the data processing device is an integrated circuit device, and wherein the integrated circuit device is part of one of a game machine, a game console, a hand-held computing device, a personal digital assistant, a communication device, a wireless telephone, a laptop computing device, a desktop computing device, or a server computing device.

20. The computer program product of claim 11, wherein using the on-chip core authentication key to authenticate and load a first piece of software comprises generating the authentication value by generating a hash value of the contents of the first piece of software using a hash function, and using the core authentication key as a key for the hash function.

21. A data processing device implementing a sealed storage, comprising:
   a processor; and
   a memory coupled to the processor, wherein the memory comprises instructions, which when executed by the processor, configure the processor to:
      generate a protected execution environment comprising a portion of a local memory of the data processing device and an associated processor of the data processing device, wherein the protected execution environment is not accessible by devices external to the protected execution environment;
      generate a software stack within the protected execution environment, wherein the software stack is generated by:
         retrieving a core decryption key and a core authentication key, wherein the core keys are hardwired into hardware of the data processing device such that the core keys are not modifiable after being hardwired into the hardware; and
         decrypting a first software module using the core decryption key, wherein the first software module contains an encrypted first decryption key and an encrypted first authentication key;
      authenticate the first software module using the core authentication key, wherein the authenticating comprises generating an authentication value by generating a hash value of the contents of the first software module using a hash function, and using the core authentication key as a key for the hash function;
      load, in response to authenticating the first software module, the first software module into the protected execution environment;
      decrypt, in response to loading the first software module, the encrypted first decryption key and the encrypted first authentication key using the core decryption key, wherein the decrypting is performed within the protected execution environment;
      decrypt a second software module using the first decryption key, wherein the second software module contains an encrypted second decryption key and an encrypted second authentication key;
      authenticate the second software module using the first authentication key;
      load, in response to authenticating the second software module, the second software module into the protected execution environment;
      decrypt, in response to loading the second software module, the encrypted second decryption key and an encrypted second authentication key using the first decryption key, wherein the decrypting is performed within the protected execution environment; and
      access, after loading the first and second software modules into the protected execution environment, a software application using the second decryption key and the second authentication key, the software application associated with the first and second software modules.

22. The data processing device of claim 21, wherein the on-chip core decryption key is only accessible from the hardware from within the protected execution environment.

23. The data processing device of claim 21, wherein each piece of software in the one or more pieces of software comprises an encrypted portion that includes an encryption key for a next piece of software in a series of pieces of software in the one or more pieces of software, and where in encrypted portion of each piece of software is encrypted using an encryption key of a previous piece of software in the series of pieces of software.

24. The data processing device of claim 21, wherein the instructions cause the processor to determine if the software stack has a specific configuration required for accessing a portion of information by:
   decrypting software of each layer of software in the software stack using a decryption key from a previous layer in the software stack;
   performing authentication of each layer of software in the software stack using an authentication key from a previous layer in the software stack; and using a decryption key from a next to last layer of software in the software stack to decrypt and access the portion of information.

25. The data processing device of claim 21, wherein the portion of information is one of an application or a portion of data to be processed by an application.

26. The data processing device of claim 21, wherein the processor is a synergistic processing unit and the memory is a local store associated with the synergistic processing unit, and wherein the instructions cause the processor to generate a protected execution environment by:
   allocating a portion of the local store for use with an isolation mode of operation of the synergistic processing unit; and
   causing the synergistic processing unit to switch operation to the isolation mode of operation.

27. The data processing device of claim 21, wherein the apparatus is a heterogeneous multiprocessor data processing system having a master processor and one or more co-processors, and wherein the master processor and the one or more co-processors operate using different instruction sets.

28. The data processing device of claim 21, wherein the apparatus is an integrated circuit device, and wherein the integrated circuit device is part of one of a game machine, a game console, a hand-held computing device, a personal digital assistant, a communication device, a wireless telephone, a laptop computing device, a desktop computing device, or a server computing device.

\* \* \* \* \*